United States Patent
Sanno

(10) Patent No.: US 12,375,804 B2
(45) Date of Patent: Jul. 29, 2025

(54) CONTROL APPARATUS, IMAGE PICKUP APPARATUS, CONTROL METHOD, AND STORAGE MEDIUM THATDETERMINE A MAIN OBJECT TO BE FOCUSED ON

(71) Applicant: CANON KABUSHIKI KAISHA, Tokyo (JP)

(72) Inventor: Masato Sanno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 18/183,995

(22) Filed: Mar. 15, 2023

(65) Prior Publication Data
US 2023/0308756 A1    Sep. 28, 2023

(30) Foreign Application Priority Data
Mar. 23, 2022 (JP) .................. 2022-046411

(51) Int. Cl.
*H04N 23/611* (2023.01)
*H04N 23/63* (2023.01)
*H04N 23/67* (2023.01)

(52) U.S. Cl.
CPC ......... *H04N 23/675* (2023.01); *H04N 23/611* (2023.01); *H04N 23/635* (2023.01)

(58) Field of Classification Search
None
See application file for complete search history.

(56) References Cited

U.S. PATENT DOCUMENTS

2021/0075972 A1*  3/2021  Fukugawa ........... G06V 10/764

FOREIGN PATENT DOCUMENTS

| JP | 2005189533 A | 7/2005 |
|---|---|---|
| JP | 2012-138665 A | 7/2012 |
| JP | 2013140270 A | 7/2013 |
| JP | 2018189854 A | 11/2018 |
| JP | 2021175133 A | 11/2021 |
| JP | 2021197729 A | 12/2021 |

OTHER PUBLICATIONS

The above foreign patent documents were cited in the May 28, 2024 Japanese Office Action, which is enclosed without an English Translation, that issued in Japanese Patent Application No. 2022-046411.

* cited by examiner

*Primary Examiner* — Paul M Berardesca
(74) *Attorney, Agent, or Firm* — Cowan, Liebowitz & Latman, P.C.

(57) ABSTRACT

A control apparatus is configured to control an image pickup apparatus that is configured to acquire image data. The control apparatus includes an acquiring unit configured to acquire an area for focus detection set to the image data, and a determining unit configured to determine as a main object that is a target to be focused on, one of a first object determined from at least one object detected inside the area and a second object determined from at least one object detected outside the area. The determining unit determines the first object and the second object by different methods.

22 Claims, 9 Drawing Sheets

CONTROL APPARATUS, IMAGE PICKUP APPARATUS, CONTROL METHOD, AND STORAGE MEDIUM THATDETERMINE A MAIN OBJECT TO BE FOCUSED ON

BACKGROUND

Technical Field

One of the aspects of the disclosure relates to a control apparatus that determines a main object to be focused on.

Description of the Related Art

There has conventionally been known a configuration that continues to focus on a main object that is determined as a target to be focused, on a real-time basis. Japanese Patent Laid-Open No. (JP) 2012-138665 proposes a configuration that determines as a main object a human face that is found with an evaluation value of a certain level or higher, or an unidentified object if there is no such human face.

However, the configuration disclosed in JP 2012-138665 may determine as a main object a human object unintended by the user, in a case where the user is aiming at an object such as an animal and a vehicle coming to a focus frame that has been set by the user.

SUMMARY

One of the aspects of the embodiment provides a control apparatus that can focus on an object intended by a user.

A control apparatus according to one aspect of the disclosure is configured to control an image pickup apparatus that is configured to acquire image data. The control apparatus includes at least one processor, and a memory coupled to the at least one processor, the memory having instructions that, when executed by the processor, perform operations as an acquiring unit configured to acquire an area for focus detection set to the image data, and a determining unit configured to determine as a main object that is a target to be focused on, one of a first object determined from at least one object detected inside the area and a second object determined from at least one object detected outside the area. The determining unit determines the first object and the second object by different methods. An image pickup apparatus including the above control apparatus also constitutes another aspect of the disclosure. A control method corresponding to the control apparatus also constitutes another aspect of the disclosure. A non-transitory computer-readable storage medium storing a program for causing a computer to execute the above control method also constitutes another aspect of the disclosure.

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

DESCRIPTION OF THE EMBODIMENTS

Figure 1A:
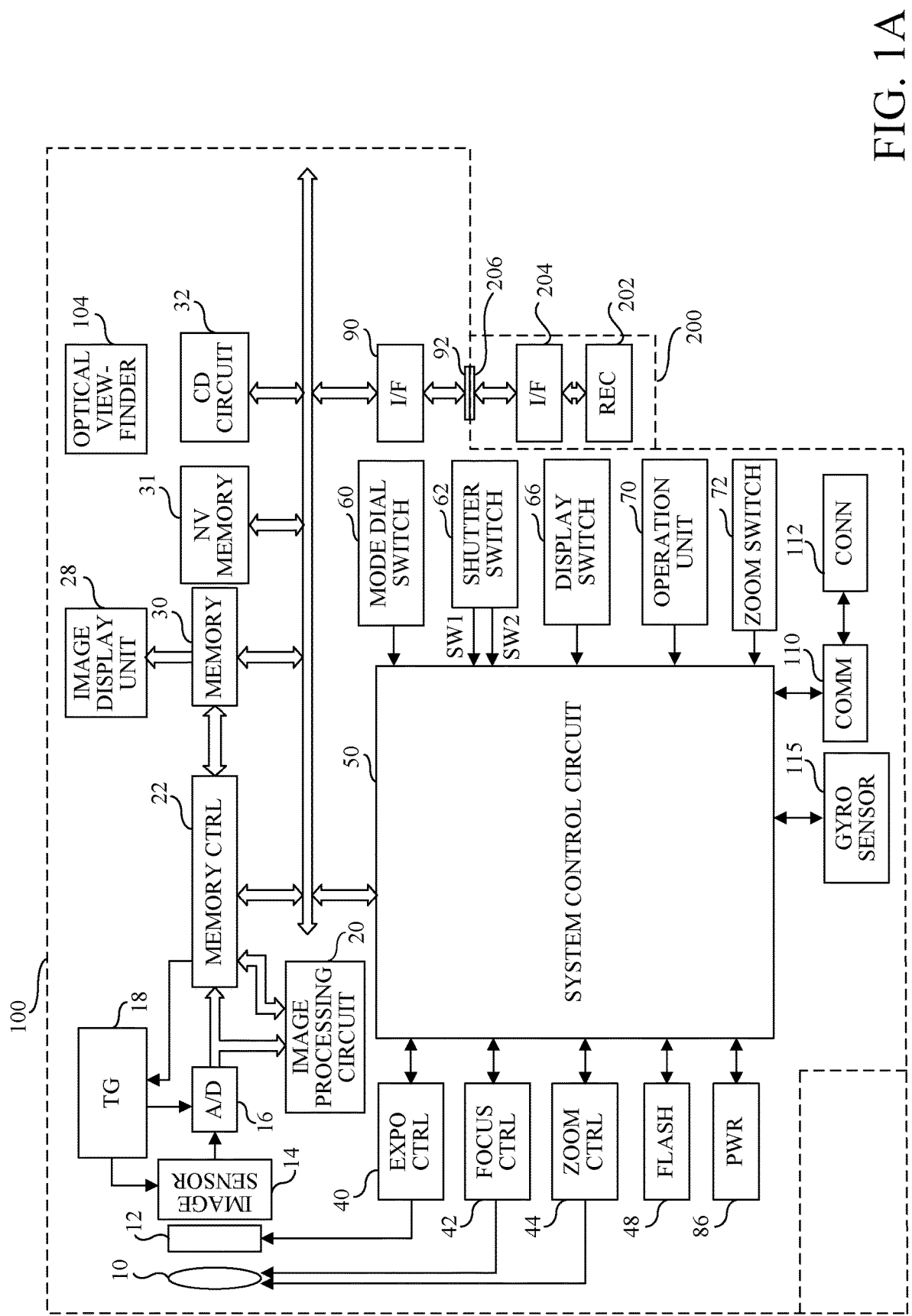
FIGS. 1A and 1B are configuration diagrams of a digital camera that is an example of an image pickup apparatus according to one embodiment of the disclosure.

Referring now to the accompanying drawings, a detailed description will be given of embodiments according to the disclosure. Corresponding elements in respective figures will be designated by the same reference numerals, and a duplicate description thereof will be omitted.

Camera Configuration

Figures 1B, 2:
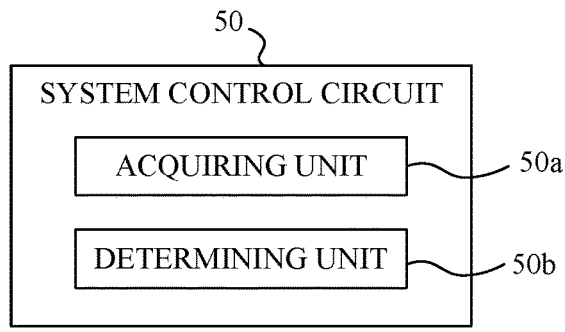
FIG. 2 illustrates a configuration of an image sensor.

FIG. 1A is a configuration diagram of a digital camera 100, which is an example of an image pickup apparatus according to one embodiment of the disclosure. The digital camera 100 includes a system control circuit 50 that functions as a control apparatus configured to control the entire digital camera 100. The system control circuit 50 includes an acquiring unit 50a and a determining unit 50b, as illustrated in FIG. 1B. The acquiring unit 50a acquires an area (focus frame) for focus detection that has been set to image data acquired by the digital camera 100. The determining unit 50b determines as a main object that is a target to be focused on (autofocus (AF) target) one of a first object determined from at least one object detected inside the area and a second object determined from at least one object detected outside the area. The determining unit 50b determines the first object and the second object by different methods. AF is a method that automatically detects a focus position by setting an object area selected by the user or an object area automatically set by the digital camera 100 to a focus detecting area.

The digital camera 100 further includes an imaging lens 10, a shutter 12, an image sensor 14, an analog-to-digital (A/D) converter 16, and a timing generator (TG) circuit 18.

The shutter 12 has an aperture stop (diaphragm) function. The image sensor 14 converts an optical image into an electrical signal. The A/D converter 16 converts an analog signal output from the image sensor 14 into a digital signal. The timing generator circuit 18 supplies a clock signal and a control signal to the image sensor 14 and the A/D converter 16.

The image sensor 14 includes a C-MOS sensor and its peripheral circuit. In the image sensor 14, one photoelectric conversion element is disposed on each of a plurality of light receiving pixels. The image sensor 14 is configured so that all pixels can independently output data. Some of the pixels are focus detecting pixels, and the image sensor 14 can perform the imaging-plane phase-difference detecting AF (imaging-plane phase-difference AF). More specifically, as illustrated in FIG. 2, the image sensor 14 includes a plurality of imaging pixels 250 each receiving a light beam passing through the entire exit pupil of the imaging optical system to generate an optical image. The image sensor 14 also includes a plurality of focus detecting pixels 251 each receiving a light beam passing through a different exit pupil area of the imaging optical system. The plurality of focus detecting pixels 251 can receive a light beam passing through the entire exit pupil of the imaging optical system as a whole. For example, in the image sensor 14, among pixels of 2 rows×2 columns, a pair of diagonally arranged G pixels are left as imaging pixels, and R pixels and B pixels are replaced with focus detecting pixels.

The system control circuit 50 performs focus detecting processing using the phase difference AF method based on the imaging signal from the focus detecting pixels embedded in the image sensor 14. More specifically, the system control circuit 50 performs focus detection based on a shift amount between a pair of images formed on the focus detecting pixels by light beams passing through a pair of pupil areas of the imaging optical system.

This embodiment realizes the imaging-plane phase-difference AF by replacing some of the imaging pixels with focus detecting pixels, but the disclosure may realize focus detection by another method. For example, this embodiment may use phase difference focus detection using a focus detecting sensor or contrast focus detection.

The digital camera 100 further includes an image processing circuit 20, a memory control circuit 22, an image display unit 28, a memory 30, a nonvolatile memory 31, and a compression/decompression (CD) circuit 32.

The image processing circuit 20 performs pixel interpolation processing, color conversion processing, noise removal processing, edge enhancement processing, etc. for the data from the A/D converter 16 or the data from the memory control circuit 22.

The image processing circuit 20 detects a human face area by performing pattern-matching processing that identifies an area that matches feature data (a shape of a facial contour portion) in the image. The image processing circuit 20 may perform pattern-matching processing using a plurality of feature data in order to increase face detection opportunities or improve detection accuracy, or may perform pattern-matching processing using part of feature data of the facial shape. The image processing circuit 20 may perform pattern-matching processing by changing the size of the feature data in order to detect the face regardless of the size of the face. The image processing circuit 20 detects an organ area, such as an eye, a nose, and a mouth of the face by performing pattern-matching processing that identifies an area that corresponds to the feature data (organ shape data) in the area detected by face detection. The image processing circuit 20 performs reliability calculation processing that indicates the likelihood of the results of the face detection and organ detection.

The image processing circuit 20 may perform face detection and organ detection using deep learning. The image processing circuit 20 may perform detection processing using one learning model selected by the system control circuit 50 from among a plurality of learning models stored in the nonvolatile memory 31, or may switch between a plurality of learning models to perform a plurality of types of detection processing.

The image processing circuit 20 performs tracking processing between images. The image processing circuit 20 generates feature data of the detected object and stores it in the memory 30. Based on the feature data stored in the memory 30, the image processing circuit 20 searches for an area that matches the feature data from the image generated at the next timing, and performs tracking processing using the matching area as an object area. The image processing circuit 20 uses, as a method of searching for an area that matches the feature data, a method of cutting out an image for each area and of setting an area having a small difference from the feature data as an object area, or a method of matching a histogram, color data, or the like.

In a case where a plurality of objects are detected, the system control circuit 50 sets an object area selected by the user or a main object area determined by the determining unit 50b as the focus detection area. In a case where no object is detected, the system control circuit 50 sets an object area detected by the tracking processing by the image processing circuit 20 as a focus detecting area. The system control circuit 50 switches to the focus detecting processing in a case where the same object is detected within a certain time period, and sets another object area to the focus detecting area in a case where tracking becomes unavailable.

The image processing circuit 20 performs predetermined calculation processing using image data in order to calculate a white balance (WB) evaluation value for performing auto white balance (AWB) processing.

The image processing circuit 20 performs predetermined calculation processing using image data to calculate an auto exposure (AE) evaluation value and a strobe exposure (or electronic flash (EF)) evaluation value for AE control processing and EF processing. The system control circuit 50 controls the exposure control unit 40 according to an algorithm based on the AE evaluation value and the EF evaluation value.

The memory control circuit 22 controls the A/D converter 16, the timing generator circuit 18, the image processing circuit 20, the memory 30, and the CD circuit 32. Data from the A/D converter 16 is written in the memory 30 via the image processing circuit 20 and the memory control circuit 22 or via the memory control circuit 22.

The image display unit 28 includes a TFT, LCD, etc., acquires image data for display written in the memory 30 via the memory control circuit 22, and displays that data. Sequentially displaying image data on the image display unit 28 can realize an electronic viewfinder (EVF) function. The image display unit 28 can arbitrarily turn on and off the display according to an instruction from the system control circuit 50. In a case where the display is turned off, the power consumption of the digital camera 100 can be reduced.

The memory 30 has a storage capacity sufficient to store a predetermined number of still images and moving images for a predetermined time. Thereby, many images can be written in the memory 30 at high speed even in continuous imaging that continuously captures a plurality of still images. The memory 30 can be used as an area for temporarily storing the feature data for authentication and as a work area for the system control circuit 50.

The nonvolatile memory 31 includes Flash ROM or the like. The system control circuit 50 sequentially reads and executes a program code written in the nonvolatile memory 31. The nonvolatile memory 31 includes an area for storing facial feature data for authentication as dictionary data, an area for storing system information, and an area for storing user setting information.

The CD circuit 32 reads an image stored in the memory 30 by adaptive discrete cosine transform (ADCT) or the like and performs compression processing or decompression processing.

The digital camera 100 further includes an exposure control unit 40, a focus control unit 42, a zoom control unit 44, and a flash 48. The exposure control unit 40 controls the shutter 12 and has a flash dimming function in association with the flash 48. The focus control unit 42 controls the focusing of the imaging lens 10. The zoom control unit 44 controls the zooming of the imaging lens 10. The flash 48 has a flash dimming function. The system control circuit 50 controls the exposure control unit 40 and the focus control unit 42 based on the calculation result of the image data by the image processing circuit 20.

The digital camera 100 includes a mode dial switch 60, a shutter switch 62, a display switch 66, an operation unit 70, and a zoom switch 72. The mode dial switch 60 is used to set a power-off mode, automatic imaging mode, imaging mode, panorama imaging mode, moving image capturing mode, playback mode, PC connection mode, and the like to the digital camera 100. In a case where a first shutter switch SW1 is turned on while the shutter switch 62 is being operated, AF processing, AE processing, AWB processing, etc. are started. In a case where the operation of the shutter switch 62 is completed and a second shutter switch SW2 is turned on, a series of imaging processing is started. The display switch 66 switches the display of the image display unit 28. The operation unit 70 includes various buttons, a touch panel, a rotary dial, and the like. The zoom switch 72 is used by the user to instruct to change the magnification of the image.

The digital camera 100 further includes a power supply unit (PWR) 86, an interface 90, a connector 92, an optical viewfinder 104, a communication unit 110, a connector 112, and a gyro sensor 115. The power supply unit 86 includes a primary battery such as an alkaline battery, a secondary battery such as a Li-ion battery, an AC adapter, and the like. The interface 90 is used to communicate with a recording medium such as a memory card and a hard disk. The connector 92 is used for connection with the recording medium such as the memory card or hard disk. The communication unit 110 has various communication functions such as USB, IEEE1394, LAN, and wireless communication. The connector 112 is used to connect the digital camera 100 to another device. The gyro sensor 115 detects a moving amount in a yawing direction and a moving amount in the pitching direction of the digital camera 100.

The recording medium 200 can be attached to and detached from the digital camera 100, and has a recorder 202 including a semiconductor memory, a magnetic disk, or the like, an interface 204 with the digital camera 100, and a connector 206 for connection with the digital camera 100.

Still Image Capturing Operation

Figure 3:
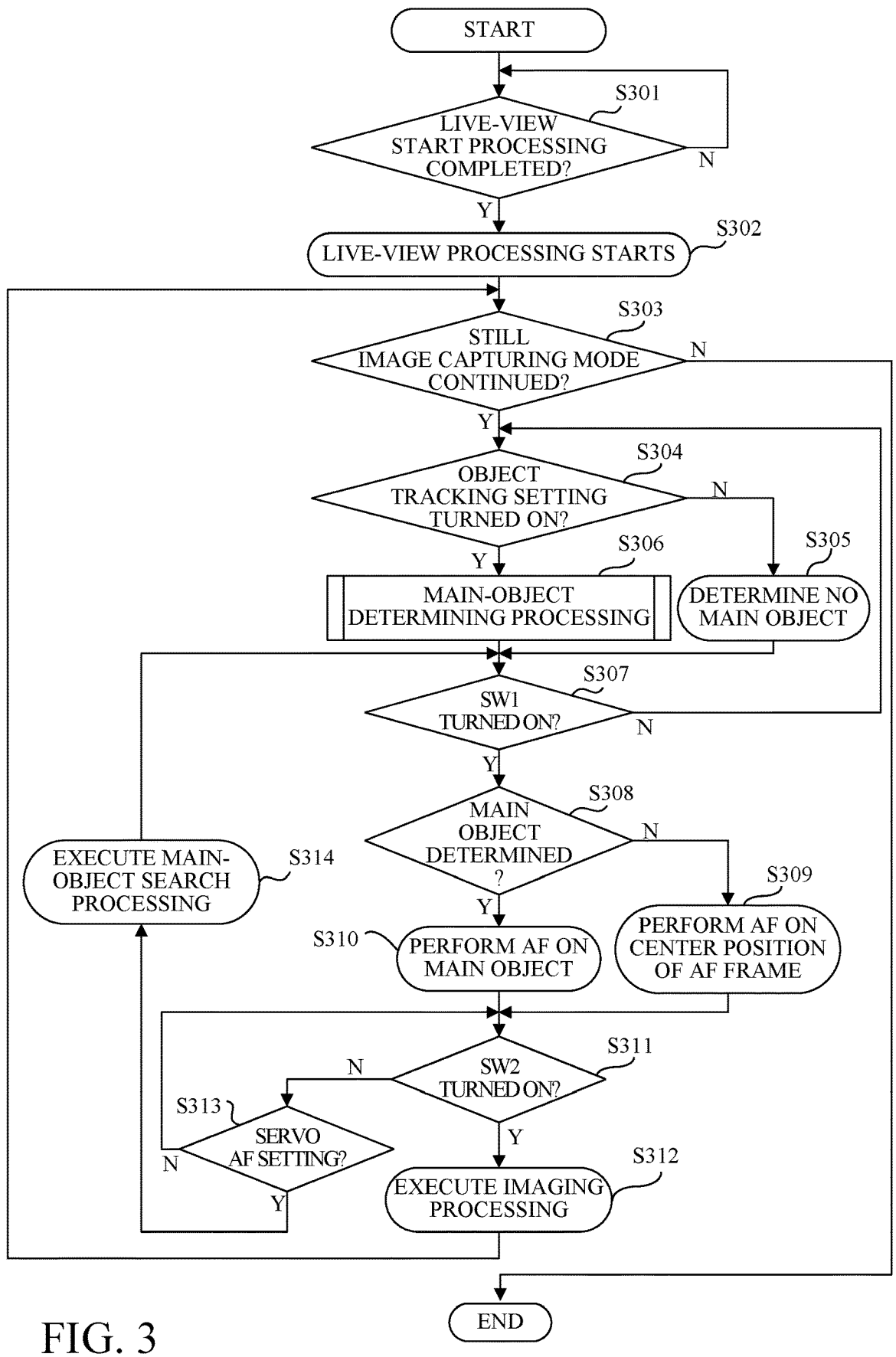
FIG. 3 is a flowchart illustrating processing by a system control circuit in a case where a still image capturing mode is set to the digital camera.

FIG. 3 is a flowchart illustrating processing by the system control circuit 50 in a case where the still image capturing mode is set to the digital camera 100.

In step S301, the system control circuit 50 determines whether or not live-view start processing has been completed. The live-view start processing is processing in which the timing generator circuit 18 supplies the clock signal and control signal for the live-view to the image sensor 14 and the A/D converter 16. In a case where it is determined that the live-view start processing has been completed, the flow proceeds to step S302, and otherwise, this step is repeated.

In step S302, the system control circuit 50 starts live-view processing. The live-view processing is processing of temporarily storing, in the memory 30, a live-view image generated by the image processing circuit 20 using data captured by the image sensor 14 and displaying it on the image display unit 28. By continuously generating and displaying the live-view image, the user can check the live-view image captured on a real-time basis using the image display unit 28.

In step S303, the system control circuit 50 determines whether the digital camera 100 continues the still image capturing mode. In a case where it is determined that the digital camera 100 is to continue the still image capturing mode, the flow proceeds to step S304; otherwise, this flow ends.

In step S304, the system control circuit 50 determines whether the object tracking setting is turned on. In a case where it is determined that the object tracking setting is turned on, the flow proceeds to step S306, and otherwise, the flow proceeds to step S305.

In step S305, the system control circuit 50 determines that there is no main object so as not to use specific object information for AF.

In step S306, the system control circuit 50 determines the main object as a target to be focused on using main-object determining processing, which will be described below.

In step S307, the system control circuit 50 determines whether or not the first shutter switch SW1 is turned on. In a case where it is determined that the first shutter switch SW1 is turned on, the flow proceeds to step S308; otherwise, the flow returns to step S304.

In step S308, the system control circuit 50 determines whether or not the main object has been determined. In a case where it is determined that the main object has been determined, the flow proceeds to step S310, and otherwise, the flow proceeds to step S309.

In step S309, the system control circuit 50 executes AF for the center position of the focus frame (AF frame). The AF position where AF is performed is the center position of the AF frame in this embodiment, but is not limited as long as it is within the AF frame. For example, an area determined to be closest to the image sensor 14 in the depth direction inside the AF frame may be set to the AF position, or an area in which color information or luminance information is prominent within the AF frame may be set as the AF position.

In step S310, the system control circuit 50 executes AF for the main object.

In step S311, the system control circuit 50 determines whether the second shutter switch SW2 is turned on. In a case where it is determined that the second shutter switch SW2 is turned on, the flow proceeds to step S312; otherwise, the flow proceeds to step S313.

In step S312, the system control circuit 50 executes imaging processing.

In step S313, the system control circuit 50 determines whether the AF setting is servo AF setting. The servo AF setting is a setting for continuously executing AF for the main object that is an AF target. In a case where it is determined that the AF setting is the servo AF setting, the flow proceeds to step S314, and otherwise, the flow returns to step S311.

In step S314, the system control circuit 50 executes main-object search processing. The main-object search processing is processing for searching for a main object position on the latest live-view image by performing tracking processing between live-view images or by calculating correlation between the object detection result of the latest live-view image and the current main object information.

Main-Object Determining Processing

Figure 4A:
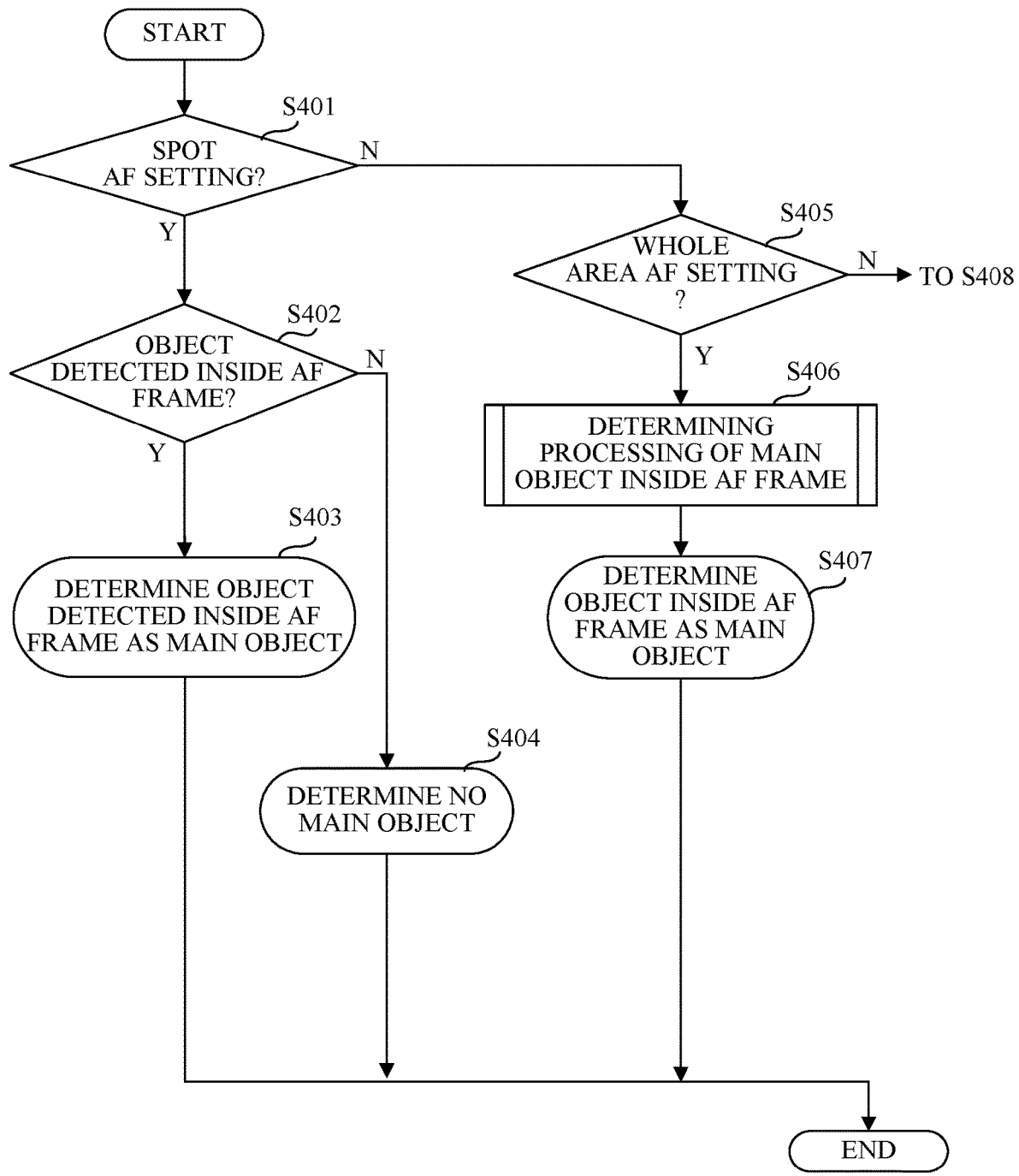
FIGS. 4A and 4B are directed to a flowchart illustrating main-object determining processing.
Figure 4B:
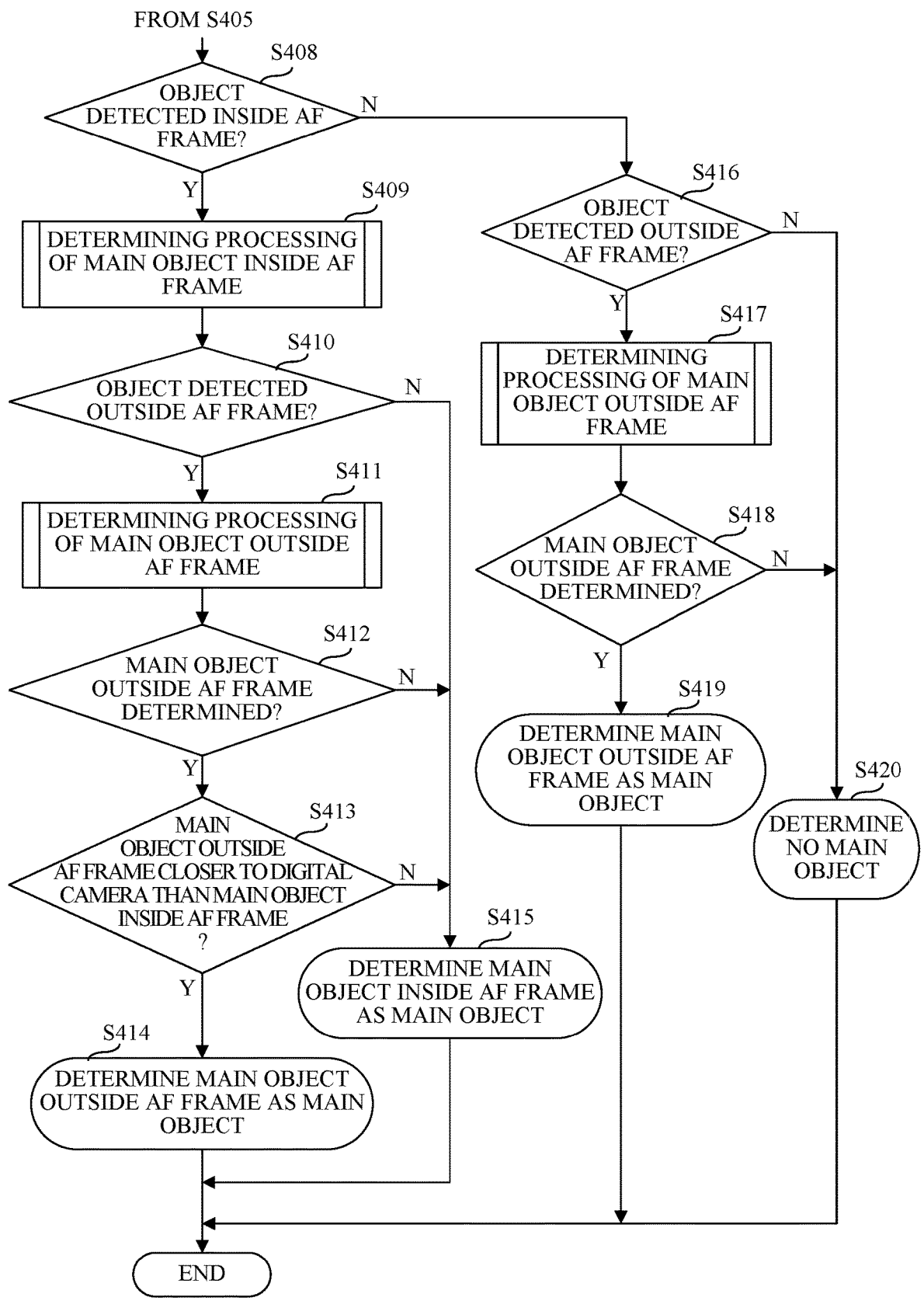
Figure 5A:
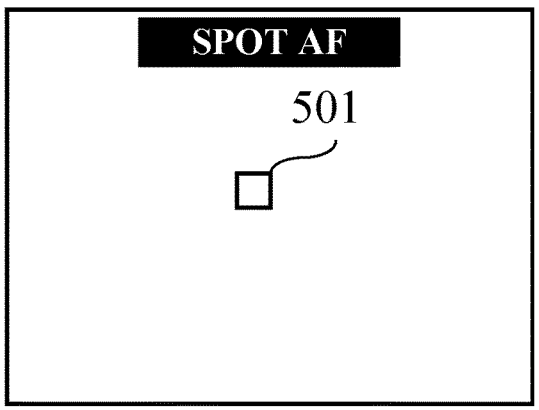
FIGS. 5A to 5D explain an AF frame.
Figure 5B:
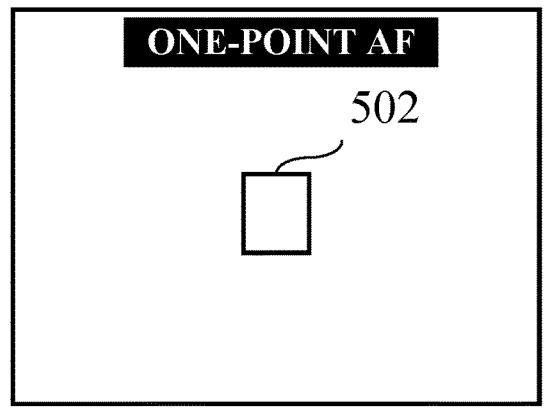
Figure 5C:
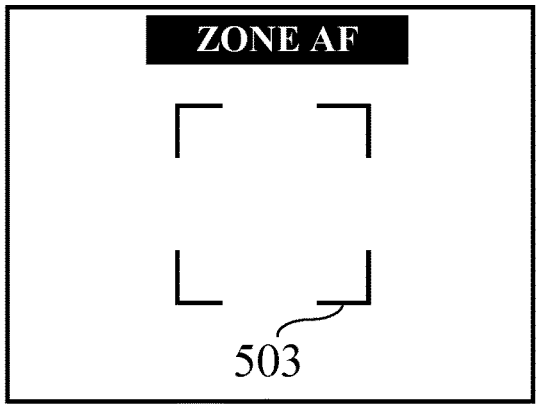
Figure 5D:
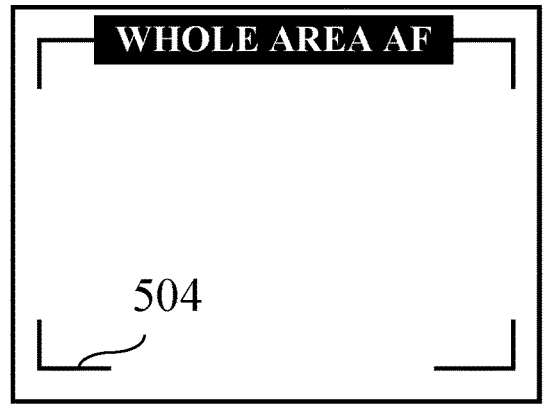

FIGS. 4A and 4B are directed to a flowchart illustrating the main-object determining processing executed in step S306 of FIG. 3.

In step S401, the system control circuit 50 determines whether or not the AF setting set by the user is spot AF setting. In a case where the AF setting is determined to be the spot AF setting, the flow proceeds to step S402; otherwise, the flow proceeds to step S405.

FIGS. 5A to 5D explain the AF frame. In the spot AF setting of FIG. 5A, a position of an AF frame 501 can be arbitrarily set by the user, and AF is performed pinpointed at the AF position. In the one-point AF setting of FIG. 5B, a position of an AF frame 502 can be arbitrarily set by the user, and AF is performed near the AF frame 502. In zone point AF setting of FIG. 5C, the user can arbitrarily set a position and size of an AF frame 503, and AF is performed at the main object position within or near the AF frame. In the whole area AF setting of FIG. 5D, an AF frame 504 is the entire image, and the AF position is determined from the entire image.

In step S402, the system control circuit 50 determines whether or not the image processing circuit 20 has detected an object inside the AF frame. In a case where it is determined that the object has been detected inside the AF frame, the flow proceeds to step S403, and otherwise, the flow proceeds to step S404.

In step S403, the system control circuit 50 determines the object detected inside the AF frame as the main object.

In step S404, the system control circuit 50 determines that there is no main object.

In step S405, the system control circuit 50 determines whether or not the AF frame setting is the whole area AF setting. In a case where it is determined that the AF setting is the whole area AF setting, the flow proceeds to step S406, and otherwise, the flow proceeds to step S407.

In step S406, the system control circuit 50 executes determining processing of a main object inside the AF frame, which will be described below.

In step S407, the system control circuit 50 determines the main object (first object) inside the AF frame as the main object.

In step S408, the system control circuit 50 determines whether or not the object has been detected inside the AF frame. In a case where it is determined that the object has been detected inside the AF frame, the flow proceeds to step S409, and otherwise, the flow proceeds to step S416.

In step S409, the system control circuit 50 determines the main object using the determining processing of the main object inside the AF frame, which will be described below.

In step S410, the system control circuit 50 determines whether or not the object has been detected outside the AF frame. In a case where it is determined that the object has been detected outside the AF frame, the flow proceeds to step S411, and otherwise, the flow proceeds to step S415.

In step S411, the system control circuit 50 executes determining processing of a main object outside the AF frame, which will be described below.

In step S412, the system control circuit 50 determines whether or not the main object (second object) outside the AF frame has been determined in step S411. In a case where it is determined that the main object outside the AF frame has been determined, the flow proceeds to step S413, and otherwise, the flow proceeds to step S415.

Figure 6:
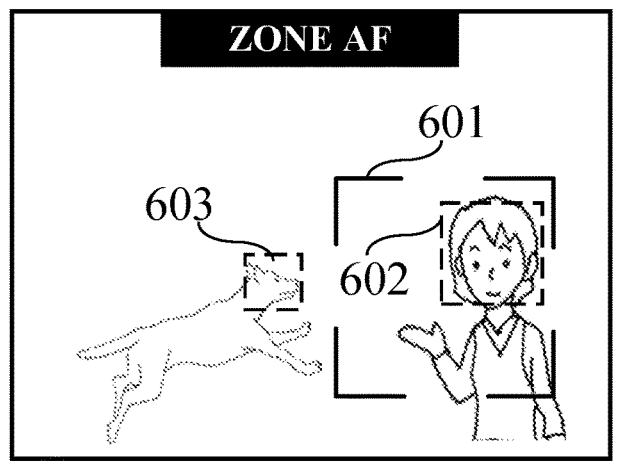
FIG. 6 explains a main-object determining method.

In step S413, the system control circuit 50 determines whether a distance from the main object outside the AF frame to the digital camera 100 is shorter than a distance from the main object inside the AF frame to the digital camera 100. The distance from the object to the digital camera 100 may be calculated using, for example, a defocus map that indicates a defocus amount for each pixel generated based on the focus detecting pixels of the image sensor 14, or may be calculated using a dedicated focus detection sensor separate from the image sensor 14. One of the main object outside the AF frame and the main object inside the AF frame that is closer to the digital camera 100 may be estimated based on a size of a detected object, a size of part of the object, and size information acquired by normalizing the size of the object. For example, as illustrated in FIG. 6, one of objects that has a larger size may be determined as the object closer to the digital camera 100 based on size information on a human face 602 as a main object inside the AF frame 601 and normalized information on a face 603 of a dog as a main object outside the AF frame 601. In a case where it is determined that the distance from the main object outside the AF frame to the digital camera 100 is shorter than the distance from the main object inside the AF frame to the digital camera 100, the flow proceeds to step S414, and otherwise, the flow proceeds to step S415.

In step S414, the system control circuit 50 determines the main object outside the AF frame as the main object.

In step S415, the system control circuit 50 determines the main object inside the AF frame as the main object.

In step S416, the system control circuit 50 determines whether or not the object has been detected outside the AF frame. In a case where it is determined that the object has been detected outside the AF frame, the flow proceeds to step S417, and otherwise, the flow proceeds to step S420.

In step S417, the system control circuit 50 executes determining processing of the main object outside the AF frame, which will be described below.

In step S418, the system control circuit 50 determines whether or not the main object outside the AF frame has been determined in step S417. In a case where it is determined that the main object outside the AF frame has been determined, the flow proceeds to step S419, and otherwise, the flow proceeds to step S420.

In step S419, the system control circuit 50 determines the main object outside the AF frame as the main object.

In step S420, the system control circuit 50 determines that there is no main object.

Determining Processing of Main Object Inside AF Frame

Figure 7:
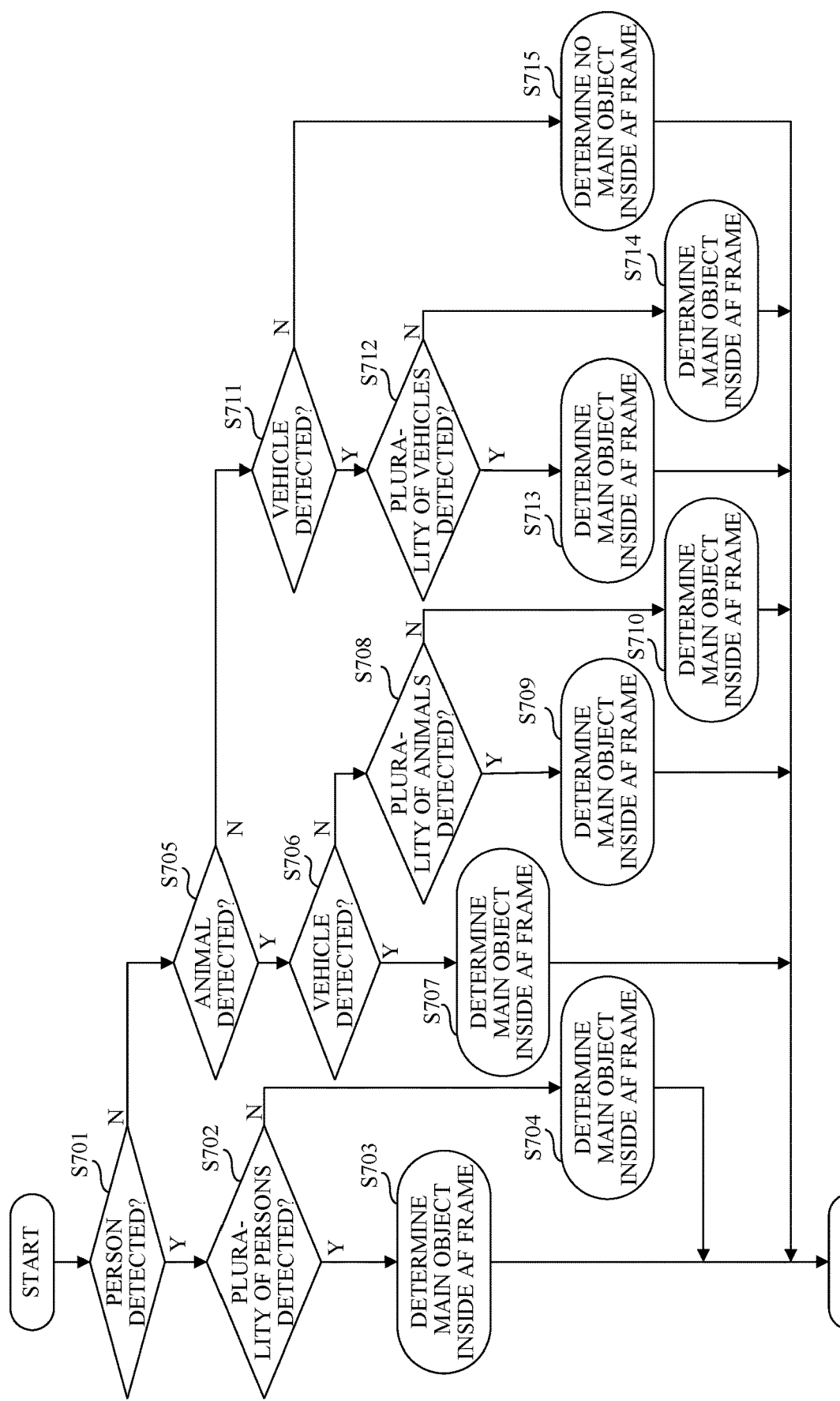
FIG. 7 is a flowchart illustrating determining processing of a main object inside an AF frame.

FIG. 7 is a flowchart illustrating the determining processing of the main object inside the AF frame, which is performed in steps S406 and S409 of FIGS. 4A and 4B, to determine the main object inside the AF frame by prioritizing a predetermined type of an object.

In step S701, the system control circuit 50 determines whether or not a person has been detected inside the AF frame. In a case where it is determined that a person has been detected, the flow proceeds to step S702, and otherwise, the flow proceeds to step S705.

In step S702, the system control circuit 50 determines whether or not there are a plurality of persons detected in step S701. In a case where it is determined that a plurality of persons has been detected, the flow proceeds to step S703, and otherwise, the flow proceeds to step S704.

In step S703, the system control circuit 50 determines a main object inside the AF frame from a plurality of persons using the positions and sizes of the human faces. More specifically, the system control circuit 50 determines as the main object inside the AF frame a person whose information acquired by multiplying a position weight and a size weight is the largest. For example, the position weight may be set such that the closer the center position of the face is to the center of the AF frame, the greater the weight becomes. The size weight may be set, for example, such that the larger the size of the object face is, the larger the weight becomes. The main object may be determined using a weight that increases as the face is oriented toward the front.

In step S704, the system control circuit 50 determines the person detected in step S701 as the main object inside the AF frame.

In step S705, the system control circuit 50 determines whether an animal such as a dog or cat has been detected inside the AF frame. In a case where it is determined that the animal has been detected, the flow proceeds to step S706, and otherwise, the flow proceeds to step S711.

In step S706, the system control circuit 50 determines whether or not a vehicle such as an automobile has been detected inside the AF frame. In a case where it is determined that the vehicle has been detected, the flow proceeds to step S707, and otherwise, the flow proceeds to step S708.

In step S707, the system control circuit 50 determines the main object inside the AF frame using the position of the object such as an animal or vehicle and the normalized size for each object type. Size normalization is performed, for example, so that in a case where the distances to the image sensor 14 of objects such as animals and vehicles are equal, the object areas have equal areas. More specifically, the system control circuit 50 determines the object whose information acquired by multiplying the position weight and the size weight is the largest as the main object inside the AF frame.

In step S708, the system control circuit 50 determines whether or not there are a plurality of animals detected in step S705. In a case where it is determined that a plurality of animals have been detected, the flow proceeds to step S709, and otherwise, the flow proceeds to step S710.

In step S709, the system control circuit 50 determines the main object inside the AF frame from the plurality of animals using the positions and sizes of the animals. More specifically, the system control circuit 50 determines the animal whose information acquired by multiplying the position weight and the size weight is the largest as the main object inside the AF frame.

In step S710, the system control circuit 50 determines the animal detected in step S705 as the main object inside the AF frame.

In step S711, the system control circuit 50 determines whether or not a vehicle such as an automobile has been detected inside the AF frame. In a case where it is determined that the vehicle has been detected, the flow proceeds to step S712, and otherwise, the flow proceeds to step S715.

In step S712, the system control circuit 50 determines whether or not there are a plurality of vehicles detected in step S711. In a case where it is determined that there is a plurality of vehicles, the flow proceeds to step S713, and otherwise, the flow proceeds to step S714.

In step S713, the system control circuit 50 determines the main object inside the AF frame from a plurality of vehicles using the vehicle positions and sizes. More specifically, the system control circuit 50 determines the vehicle whose information acquired by multiplying the position weight and the size weight is the largest as the main object inside the AF frame.

In step S714, the system control circuit 50 determines the vehicle detected in step S711 as the main object inside the AF frame.

In step S715, the system control circuit 50 determines that there is no main object inside the AF frame.

Determining Processing of Main Object Outside AF Frame

Figure 8:
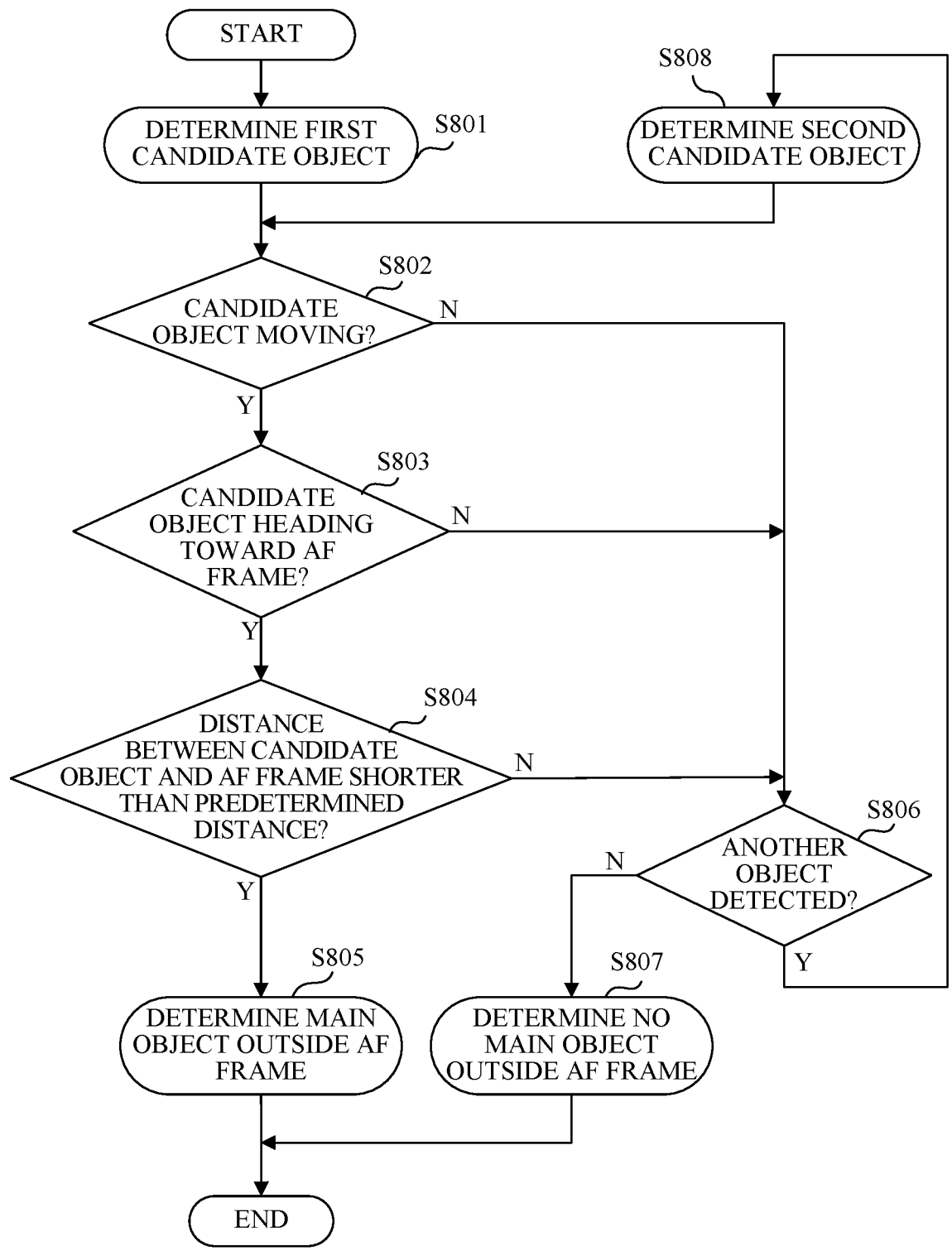
FIG. 8 is a flowchart illustrating determining processing of a main object outside the AF frame.

FIG. 8 is a flowchart illustrating the determining processing of the main object outside the AF frame, which is performed in steps S410 and S416 of FIG. 4B, to determine the main object outside the AF frame based on the distance between the object and the AF frame.

Figure 9:
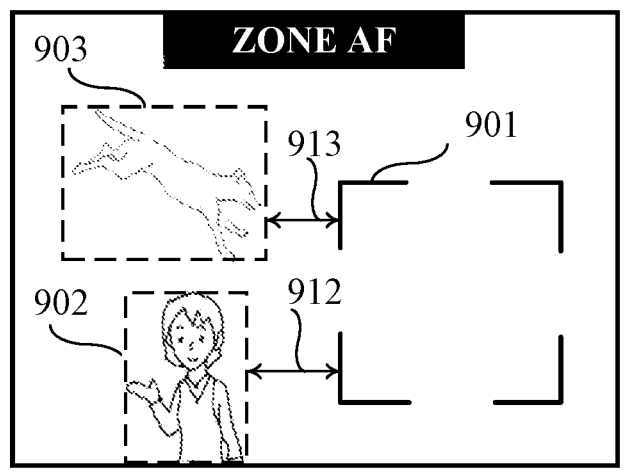
FIG. 9 explains a method of determining a candidate object.

In step S801, the system control circuit 50 determines an object closest to the AF frame among objects outside the AF frame as a candidate object (first candidate object) for a main object outside the AF frame. The candidate object is determined regardless of the object type such as people, animals, and vehicles. FIG. 9 explains a method of determining the candidate object. An object located in an object area which has a smaller one of a distance 912 between a boundary of an AF frame 901 and an object area 902 and a distance 913 between the boundary of the AF frame 901 and an object area 903 is set as a candidate object. In FIG. 9, since the distance 913 is shorter, the object within the object area 903 is determined as the candidate object.

In step S802, the system control circuit 50 determines whether or not the candidate object is moving. For example, the system control circuit 50 periodically monitors the area position of the candidate object, and determines that the candidate object is moving in a case where the current area position changes from the past position by a predetermined distance or more. In a case where it is determined that the candidate object is moving, the flow proceeds to step S803, and otherwise, the flow proceeds to step S806.

In step S803, the system control circuit 50 determines whether or not the candidate object is heading toward the AF frame. For example, the system control circuit 50 can determine whether the candidate object is heading toward the AF frame using a deep learning model that can determine the object direction, such as an orientation of a human or animal face, or a direction of a vehicle tip. In a case where the position of the object area is closer to the AF frame than the position of the object area detected in the past, it may be determined that the candidate object is heading toward the AF frame. In a case where it is determined that the candidate object is heading toward the AF frame, the flow proceeds to step S804, and otherwise, the flow proceeds to step S806.

In step S804, the system control circuit 50 determines whether or not the distance between the candidate object and the AF frame is shorter than a predetermined distance. The predetermined distance may be, for example, a length obtained by multiplying the diagonal distance of the object area by a constant ratio, or may be a moving amount of the candidate object per unit time. The predetermined distance may be determined according to the panning direction and panning amount of the digital camera 100 using the angular velocity information from the gyro sensor 115. In a case where it is determined that the distance between the candidate object and the AF frame is shorter than the predetermined distance, the flow proceeds to step S805, and otherwise, the flow proceeds to step S806.

In step S805, the system control circuit 50 determines the candidate object as the main object outside the AF frame.

In step S806, the system control circuit 50 determines whether or not another object has been detected outside the AF frame. In a case where it is determined that the other object has been detected, the flow proceeds to step S808, and otherwise, the flow proceeds to step S807.

In step S807, the system control circuit 50 determines that there is no main object outside the AF frame.

In step S808, the system control circuit 50 determines an object next to the first candidate object closest to the AF frame among objects outside the AF frame, as a candidate object (second candidate object).

As described above, the configuration according to this embodiment can focus on the object intended by the user according to scenes by changing a determining method between a main object that is an AF target inside the AF frame and a main object outside the AF frame.

While this embodiment has discussed an example in which the main object determination process is used in still image imaging with the digital camera 100, but the main object determining processing may be used during moving image capturing standby or during moving image capturing.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-046411, filed on Mar. 23, 2022, which is hereby incorporated by reference herein in its entirety.

What is claimed is:

1. A control apparatus comprising:
at least one processor; and
a memory coupled to the at least one processor, the memory having instructions that, when executed by the processor, perform operations as:
a detection unit configured to detect objects of a plurality of types from image data based on signals output from an image sensor; and
a determining unit configured to determine a main object that is a target to be focused on, based on a detection result from the detection unit,
wherein, when the objects of the plurality of types are inside a focus frame, the determining unit determines the main object based on the type, and
wherein, when none of the objects of the plurality of types are inside the focus frame, and the objects of the plurality of types are outside the focus frame, the determining unit determines the main object based on a distance from the focus frame.

2. The control apparatus according to claim 1, wherein the determining unit determines the main object by prioritizing a predetermined type of object when the objects of the plurality of types are inside the focus frame.

3. The control apparatus according to claim 1, wherein in a case where a plurality of high-priority type objects are detected inside the focus frame, the determining unit determines the main object based on at least one of a size and position of each of the plurality of high-priority type objects.

4. The control apparatus according to claim 1, wherein the determining unit determines the main object based on a moving direction of the object, when the objects of the plurality of types are not inside the area, and the objects of the plurality of types are outside the area.

5. An image pickup apparatus configured to acquire image data, the image pickup apparatus comprising:
a control apparatus configured to control the image pickup apparatus; and
an image sensor,
wherein the control apparatus includes:
at least one processor; and
a memory coupled to the at least one processor, the memory having instructions that, when executed by the processor, perform operations as:
a detection unit configured to detect objects of a plurality of types from image data based on signals output from an image sensor; and
a determining unit configured to determine a main object that is a target to be focused on, based on a detection result from the detection unit,
wherein, when the objects of the plurality of types are inside a focus frame, the determining unit determines the main object based on the type, and
wherein, when none of the objects of the plurality of types are inside the focus frame, and the objects of the plurality of types are outside the focus frame, the determining unit determines the main object based on a distance from the focus frame.

6. A control method comprising:
detecting objects of a plurality of types from image data based on signals output from an image sensor and
determining a main object that is a target to be focused on, based on a detection result from the detection unit,
wherein, when the objects of the plurality of types are inside a focus frame, the main object is determined based on the type, and wherein, when none of the objects of the plurality of types are inside the focus frame, and the objects of the plurality of types are outside the focus frame, the main object is determined based on a distance from the focus frame.

7. A non-transitory computer-readable storage medium storing a program for causing a computer to execute the control method according to claim 6.

8. A control apparatus comprising:
at least one processor; and
a memory coupled to the at least one processor, the memory having instructions that, when executed by the processor, perform operations as:
a detection unit configured to detect objects of a plurality of types, including a person and an object of a predetermined type other than a person, from image data based on signals output from an image sensor; and
a determining unit configured to determine a main object that is a target to be focused on, based on a detection result from the detection unit,
wherein, when both the person and the object of the predetermined type are inside a focus frame, the determining unit determines the person as the main object, and
wherein, when none of the plurality of types of objects is inside the focus frame, both the person and the object of the predetermined type are outside the focus frame, and the object of the predetermined type is closer to the focus frame than the person, the determining unit determines the object of the predetermined type as the main object.

9. The control apparatus according to claim 8, wherein, when multiple persons are detected inside the focus frame, the determining unit determines the main object based on at least one of a size and position of each of the multiple persons.

10. The control apparatus according to claim 8, wherein the object of the predetermined type is an animal.

11. The control apparatus according to claim 8, wherein the object of the predetermined type is a vehicle.

12. The control apparatus according to claim 8, wherein a size of the focus frame can be set by users.

13. The control apparatus according to claim 8, wherein a position of the focus frame can be set by users.

14. The control apparatus according to claim 8, wherein the detection unit is capable of detecting persons, animals, and vehicles as the objects of the plurality of types.

15. The control apparatus according to claim 8, wherein focusing is performed using imaging-plane phase-difference AF.

16. An image pickup apparatus configured to acquire image data, the image pickup apparatus comprising:
a control apparatus configured to control the image pickup apparatus; and
an image sensor,
wherein the control apparatus includes:
at least one processor; and
a memory coupled to the at least one processor, the memory having instructions that, when executed by the processor, perform operations as:
a detection unit configured to detect objects of a plurality of types, including a person and an object of a predetermined type other than a person, from image data based on signals output from an image sensor; and
a determining unit configured to determine a main object that is a target to be focused on, based on a detection result from the detection unit,
wherein, when both the person and the object of the predetermined type are inside a focus frame, the determining unit determines the person as the main object, and
wherein, when none of the plurality of types of objects is inside the focus frame, both the person and the object of the predetermined type are outside the focus frame, and the object of the predetermined type is closer to the focus frame than the person, the determining unit determines the object of the predetermined type as the main object.

17. A control method configured to control an image pickup apparatus that is configured to acquire image data, the control method comprising:
detecting objects of a plurality of types, including a person and an object of a predetermined type other than a person, from image data based on signals output from an image sensor; and
determining a main object that is a target to be focused on, based on a detection result from the detection unit,
wherein, when both the person and the object of the predetermined type are inside a focus frame, the person is determined as the main object, and
wherein, when none of the plurality of types of objects is inside the focus frame, both the person and the object of the predetermined type are outside the focus frame, and the object of the predetermined type is closer to the focus frame than the person, the object of the predetermined type is determined as the main object.

18. A non-transitory computer-readable storage medium storing a program for causing a computer to execute the control method according to claim 17.

19. The control apparatus according to claim 1, wherein a size of the focus frame can be set by users.

20. The control apparatus according to claim 1, wherein a position of the focus frame can be set by users.

21. The control apparatus according to claim 1, wherein the detection unit is capable of detecting persons, animals, and vehicles as the objects of the plurality of types.

22. The control apparatus according to claim 1, wherein focusing is performed using imaging-plane phase-difference AF.

* * * * *